US010120709B2

(12) United States Patent
Tsirkin et al.

(10) Patent No.: US 10,120,709 B2
(45) Date of Patent: Nov. 6, 2018

(54) GUEST INITIATED ATOMIC INSTRUCTIONS FOR SHARED MEMORY PAGE HOST COPY ON WRITE

(71) Applicant: Red Hat Israel, LTD, Raanana (IL)

(72) Inventors: Michael Tsirkin, Yokneam Illit (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 306 days.

(21) Appl. No.: 15/056,778

(22) Filed: Feb. 29, 2016

(65) Prior Publication Data
US 2017/0249179 A1 Aug. 31, 2017

(51) Int. Cl.
| | |
|---|---|
| G06F 9/455 | (2018.01) |
| G06F 3/06 | (2006.01) |
| G06F 12/1081 | (2016.01) |
| G06F 12/1009 | (2016.01) |
| G06F 13/28 | (2006.01) |
| G06F 13/16 | (2006.01) |

(52) U.S. Cl.
CPC ........ *G06F 9/45558* (2013.01); *G06F 3/0619* (2013.01); *G06F 3/0659* (2013.01); *G06F 3/0683* (2013.01); *G06F 12/1009* (2013.01); *G06F 12/1081* (2013.01); *G06F 13/1663* (2013.01); *G06F 13/28* (2013.01); *G06F 2009/45579* (2013.01); *G06F 2212/1032* (2013.01)

(58) Field of Classification Search
CPC .................................................. G06F 13/1663
See application file for complete search history.

(56) References Cited

U.S. PATENT DOCUMENTS

| | | |
|---|---|---|
| 7,783,858 B2 | 8/2010 | Chiang et al. |
| 7,882,330 B2 | 2/2011 | Haertel et al. |
| 7,984,203 B2 * | 7/2011 | Madukkarumukumana ................ G06F 13/28 710/22 |
| 8,505,032 B2 | 8/2013 | Craddock et al. |
| 8,719,464 B2 | 5/2014 | Kegel et al. |
| 2013/0145051 A1 | 6/2013 | Kegel et al. |
| 2013/0145055 A1 | 6/2013 | Kegel et al. |

(Continued)

OTHER PUBLICATIONS

Peleg et al., "Utilizing the IOMMU Scalably", https://www.usenix.org/system/files/conference/atc15/atc15-paper-peleg.pdf, Technion-Israel Institute of Technology/Google, published on Jul. 8-10, 2015, 15 pages, published at 2015 USENIX Annual Technical Conference, Santa Clara, CA, USA.

(Continued)

*Primary Examiner* — Farley Abad
(74) *Attorney, Agent, or Firm* — Lowenstein Sandler LLP (57) ABSTRACT

A guest OS detects a DMA write request for a device assigned to the guest OS to perform a DMA write to a shared page of memory that has a write protection attribute to cause a protection page fault upon an attempt to write to the shared page of memory. The guest OS reads a portion of the shared page of memory from a location of that page, determines the value of the portion, and executes an atomic instruction that writes the value back to the location of the shared page of memory to trigger the page protection fault. Upon executing the atomic instruction, the guest OS sends the DMA write request to the device to cause the device to write to a writeable copy of the shared page of memory.

20 Claims, 5 Drawing Sheets

(56) References Cited

U.S. PATENT DOCUMENTS

2013/0346725 A1* 12/2013 Lomet .................... G06F 12/10
711/206
2015/0220354 A1    8/2015 Nair
2016/0034397 A1*  2/2016 Lam ..................... G06F 12/0842
711/119

OTHER PUBLICATIONS

Amit, "Alleviating Virtualization Bottlenecks", http://assaf.net.technion.ac.il/files/2013/01/Nadav-Amit-Dissertation.pdf, Technion, Technion-Israel Institute of Technology, Mar. 2014, 137 pages.
Marazakis, "I/O in Linux Hypervisors and Virtual Machines Lecture for the Embedded Systems Course", http://www.csd.uoc.gr/~hy428/reading/vmio_may8_2014.pdf, Institute of Computer Science; Foundation for Research and Technology—Hellas (Forth), May 8 & 10, 2014, 78 pages, CSD, University of Crete.

* cited by examiner

GUEST INITIATED ATOMIC INSTRUCTIONS FOR SHARED MEMORY PAGE HOST COPY ON WRITE

TECHNICAL FIELD

The present disclosure is generally related to computer systems, and more particularly, to memory management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS."

Physical devices, such as network devices, can be made available to guests by the hypervisor by a process known as device assignment. The hypervisor can create a virtual device within the guest that is associated with the physical device so that any access of the virtual device can be forwarded to the physical device by the hypervisor with little or no modification. Direct memory access (DMA) allows physical devices in a computer to access system memory for reading and/or writing independently of the central processing unit (CPU). Hardware devices that are capable of performing DMA include disk drive controllers, graphics cards, network cards and sound cards.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for guest initiated atomic instructions for shared memory page host copy on write. In virtualized systems, the guest operating system of a virtual machine usually does not know the host physical address that it accesses. Instead, the virtual machine operates using virtualized guest physical addresses mapped to host physical addresses. Typically, multiple virtual machines can share the same memory for reading the same data. Such implementations can support memory overcommit, which allows the assignment of more guest memory to virtual computing devices than the amount of physical memory available. A hypervisor can identify identical pages of guest memory and modify mappings to point to a single shared page to free up the other pages that contained the identical data in the host memory for other use. The shared page may be write-protected and when an attempt is made by a virtual machine to write to the shared page, a protection page fault is triggered, which causes a copy of the shared page to be created for the write operation.

Direct memory access (DMA) allows physical devices in a computer to access system memory for reading and/or writing independently of the central processing unit (CPU). While a physical device is performing a DMA, the CPU can engage in other operations. DMA is especially useful in real-time computing applications where it is critical to avoid the stalling of concurrent operations. With conventional DMA systems, if a device is assigned to a guest operating system of a virtual machine and attempts to modify shared memory, a page fault is typically not triggered and an error can occur. Devices in traditional DMA systems may not be able to recover from such errors and handling the error recovery in real time incurs significant overhead that degrades the performance of the system.

Before a physical device initiates a DMA operation to a shared memory page, a guest operating system could execute a write to the page which would cause a copy on write action by the hypervisor. However, this would only be effective if no other process or CPU in the system is also accessing the data in the shared page at the time of the write by the guest. It is difficult to predict in advance which portions of a shared page are safe to write into without conflicting with another CPU or device. Alternatively, a guest operating system could execute a special instruction to notify the hypervisor directly of the need for a writeable copy of the shared memory page to be used by a physical device. This, however, is computationally expensive as it transfers control to the hypervisor. Thus, some systems typically avoid sharing memory where DMA access for physical devices is used.

Aspects of the present disclosure address the above noted and other deficiencies by implementing guest initiated atomic instructions for shared memory page host copy on write. After detecting a request for a physical device to perform a DMA write to a shared page of memory, a guest OS can read a portion of the shared page of memory from a specific location on the page, and execute an atomic instruction that writes the portion of the shared page back to the same location atomically. An atomic instruction is an instruction that can be executed without any other process being able to modify the same memory location of the shared page of memory specified in the instruction. Thus, the guest can complete the write operation while locking out any updates to the page by another process, and can cause the hypervisor to create a writeable copy of the page without needing to explicitly notify the hypervisor directly.

In an illustrative example, a guest operating system (OS) of a virtual machine can detect a direct memory access (DMA) write request for a device assigned to the guest OS to perform a DMA write to a shared page of memory. The shared page of memory may have a write protection attribute to cause a protection page fault upon an attempt to write to the shared page of memory. In some implementations, the guest OS can monitor a device driver and detect that the device driver receives instructions from a process running in the virtual machine to perform a DMA write operation by the device that is assigned to the guest OS. The DMA write request may include a guest physical address for the requested shared page of memory. The guest OS may then block the DMA write request from being sent to the device. In some implementations, the guest OS can trap the device driver for the device and obtain control to block the device driver from sending the DMA write request to the device. In some implementations, the device driver can send a request to the guest OS to allow a DMA write operation to an address. In response to such a request, the guest OS can immediately execute an atomic instruction (as described in further detail below) before returning control to the device driver.

The guest OS may then read a portion of the shared page of memory from a particular location of the shared page of memory. The guest OS may read any amount of the shared page of memory (e.g., bits, bytes, etc.) from any location of the shared page of memory (e.g., the beginning of the page, the end of the page, a specific address location within the page, a specific offset from the beginning of the page, etc.). For example, the guest OS may read a byte of memory starting at the first memory location of the shared memory page (e.g., the first byte of the shared memory page). In some implementations, the guest OS may then determine the value of the portion of the shared page of memory that was read from the particular location. For example, the guest OS may determine that the first byte (8 bits) read from the first position of the shared memory page (e.g., read from the beginning of the page) has a value of '11111111'. Alternatively, the guest OS may execute an atomic instruction as further described below using the portion of the shared page of memory without first determining its value.

The guest OS may then execute an atomic instruction that writes the value of the portion of the shared page of memory back to the same location of the shared page of memory from which it was read. An atomic instruction is an instruction that can be executed without any other process being able to modify the same memory location of the shared page of memory specified in the instruction. The atomic instruction can lock the location of the shared page of memory specified in the instruction, preventing it from being updated by another process until the atomic instruction completes.

In an illustrative example, the guest OS may execute an atomic "compare and swap" instruction using the value of the portion of the shared memory page read from the specific location. A compare and swap instruction compares the contents of a memory location to a given value and, only if they are the same, modifies the contents of that memory location to a given new value. Since the instruction is executed as a single atomic operation, no other process may update the portion of memory while the instruction is executing (e.g., after the compare but before the write). To write to the shared page of memory without modifying the page, the compare and swap instruction may be executed such that the given value and given new value may both be set to the value of the portion of the shared page of memory read by the guest OS. In the example described above, the guest OS reads a value of '11111111' from the first byte of the shared page of memory. The compare and swap may be executed to compare the contents of the first byte of the shared page of memory to the value '11111111' that was read by the guest OS (the given value). If the two are the same (meaning, that nothing has updated that location of the shared page of memory between the time of the read and the time the compare and swap instruction was executed), the compare and swap instruction can write '11111111' (the given new value) back to the first byte of the shared page of memory.

In another illustrative example, the guest OS may execute an atomic instruction that performs a logical "OR" operation on the value of the portion of the shared page of memory with a value of all zeros. An OR operation takes two bit patterns of equal length and performs a logical inclusive OR operation on each pair of corresponding bits. The result in each position is 0 if both bits are 0, while otherwise the result is 1. Thus performing an OR operation on an input value with all zeros should result in a result value that is the same as the input value. In the example noted above, if the guest OS performs an atomic OR on the value '11111111' with a value of '00000000' (all zeros), the resulting value should be '11111111'. The guest can subsequently write the resulting value that matches the input value back to the first byte of the shared page of memory.

In another illustrative example, the guest OS may execute an atomic instruction that performs a logical "AND" operation on the value of the portion of the shared page of memory with a value of all ones. An AND operation takes two bit patterns of equal length and performs a logical AND operation on each pair of corresponding bits by multiplying them. The result in each position is 1 if both bits are 1, while otherwise the result is 0. Thus performing an AND operation on an input value with all ones should result in a result value that is the same as the input value. In the example noted above, if the guest OS performs an atomic OR on the value '11111111' with a value of '11111111' (all ones), the resulting value should be '11111111'. The guest can subsequently write the resulting value that matches the input value back to the first byte of the shared page of memory.

In another illustrative example, the guest OS may execute an atomic instruction that performs an arithmetic operation on the value of the portion of the shared page of memory with a value of all zeros, where the arithmetic operation is either an ADD operation or a SUBTRACT operation. Thus performing either an ADD or a SUBTRACT operation on an input value regardless of its actual value should yield a result value that is the same as the input value. In the example noted above, if the guest OS performs an atomic ADD on the value '11111111' with a value of '00000000' (all zeros), the resulting value should be '11111111'. Similarly, if the guest OS performs an atomic SUBTRACT on the value '11111111' with a value of '00000000' (all zeros), the resulting value should again be '11111111'. The guest can subsequently write the resulting value that matches the input value back to the first byte of the shared page of memory.

In another illustrative example, the guest OS may execute an atomic instruction that performs an arithmetic operation on the value of the portion of the shared page of memory with a value of all ones, where the arithmetic operation is a MULTIPLY operation. Thus, performing the MULTIPLY operation on an input value regardless of its actual value should yield a result value that is the same as the input value. In the example noted above, if the guest OS performs an atomic MULTIPLY on the value '11111111' with a value of '11111111' (all ones), the resulting value should be '11111111'. The guest can subsequently write the resulting value that matches the input value back to the first byte of the shared page of memory.

Thus, the atomic instruction can write to the shared page of memory without changing any of the contents of the shared page of memory. Although several examples of atomic instructions have been described for simplicity, it should be noted that other atomic instructions may be used that cause a write to a memory page without modifying the contents of the memory page. In some implementations, the read and re-write steps described above may be completed by the same atomic instruction. For example, an atomic instruction may be executed that first reads a portion of the shared page of memory and subsequently writes the value of that portion of the shared page of memory back to the same location of the shared page of memory. In an illustrative example, a "lock orl $0,0x10(% eax)" instruction (on a system using an Intel® x86 architecture) may be executed that executes load and store operations within the same atomic instruction.

As noted above, since the shared page of memory has a write protection attribute to cause a protection page fault upon an attempt to write to the page, successful execution of the atomic instruction may subsequently trigger the protection page fault to a hypervisor. The page protection fault can indicate to the hypervisor that the shared page has been updated without requiring the guest OS to explicitly notify the hypervisor directly. Responsive to the page protection fault, the hypervisor may complete a copy-on-write operation to create a writeable copy of the shared page of memory for use by the guest OS to provide to the assigned device. Upon executing the atomic instruction, the guest OS may then send the DMA write request to the device to cause the device to write to the writable copy of the shared page of memory.

In some implementations, the atomic instruction may be associated with a "succeed-or-fail" property. For example, the instruction may either successfully update the shared page of memory (e.g., the instruction succeeds), or have no apparent effect on the shared page of memory (e.g., the instruction fails). In such implementations, the guest OS may send the DMA write request to the device responsive to determining that the atomic instruction completed successfully. Responsive to determining that the atomic instruction completed unsuccessfully (e.g., the instruction failed), the guest OS may repeat the above process and re-execute the atomic instruction.

In an illustrative example, if the guest OS executed an atomic compare and swap instruction, the instruction may have failed because another process may have updated the share page of memory between the time that the guest OS read the portion of the shared memory page from the specific location and the time that the guest OS executed the atomic instruction with the value read. For example, the guest OS may have read '11111111' from the first byte of the shared page of memory, and used that value as input to the atomic compare and swap instruction. If another process updated the first byte of the shared page of memory (e.g., to '00000001' for example), the compare and swap instruction would fail since the value at the first byte no longer matches the '11111111' value specified by the instruction. Responsive to determining that the instruction failed, the guest OS may repeat the process to re-attempt to write to the shared page of memory without updating the shared page of memory.

The guest OS may first re-read the portion of the shared page of memory from the specific location of the shared page of memory. The guest OS may then determine the new value of the portion of the shared page of memory, and subsequently re-execute the atomic instruction that writes the new value of the portion of the shared page of memory back to the same location of the shared page of memory from which it was read. As with the initial execution of the atomic instruction noted above, successful execution of the atomic instruction may then trigger a page protection fault in view of the write protection attribute for the shared page of memory. The page protection fault may then cause an exit to the hypervisor to create a writeable copy of the shared page of memory that can be used by the device for the DMA write request. The guest OS may then send the DMA write request to the device so the device may execute the DMA write to the writable copy of the shared page of memory.

Aspects of the present disclosure are thus capable of implementing guest initiated atomic instructions for shared memory page host copy on write. More particularly, a guest can initiate a host copy on write operation for a shared memory page for use with a physical device without incurring the overhead required by a direct request to the hypervisor. Moreover, DMA access to shared memory pages for physical devices may be implemented safely, without the danger of unrecoverable errors, or the overhead incurred for recovery of such errors.

Figure 1:
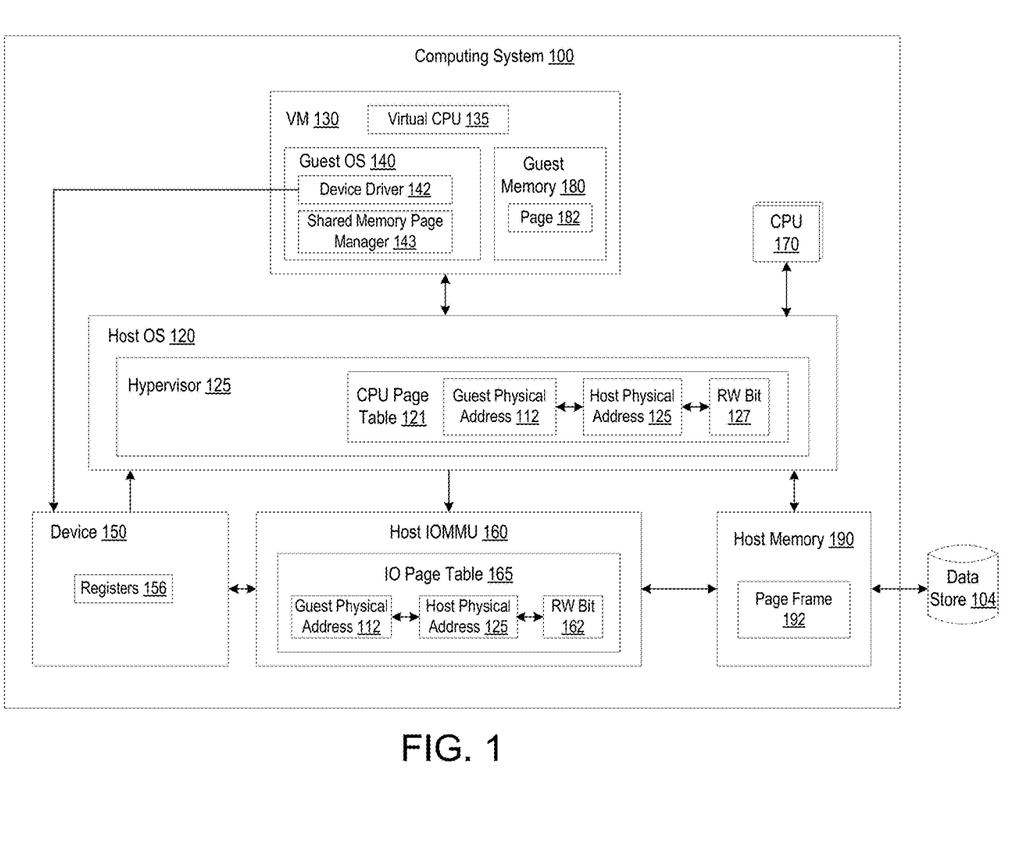
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 can host one or more virtual machines (VM) 130. Each virtual machine 130 runs a guest operating system (OS) 140. The virtual machines 130 may have the same or different guest operating systems 140. The computer system 100 may be a server computer, a desktop computer, a set-top box, a portable computing device such as, and not limited to, netbooks, laptop computers, an electronic book reader, and the like.

VM 130 may additionally include a shared memory page manager 143 that can facilitate guest initiated atomic instructions for shared memory page host copy on write, as described in detail below with respect to FIGS. 3-4. Shared memory page manager 143 may be invoked by guest OS 140 to read a portion of page frame 192 from a particular location of the page, and initiate an atomic instruction that can write the value read back to the same location. The write can subsequently trigger a protection page fault that will cause hypervisor 125 to create a writeable copy of page frame 192 that may be used for a DMA write operation by device 150.

The computer system 100 runs a host OS 120 to manage system resources. In one implementation, the computer system 100 runs a hypervisor 125 to virtualize access to the underlying host hardware, making the use of the virtual machine 130 transparent to the guest operating systems 140 and the user of the computer system 100. In some implementations, the hypervisor 125 may be part of the host OS 120. The computer system 100 includes hardware components such as one or more physical central processing units (CPUs) 170, memory 190 (also referred to as "host memory", "host physical memory", or "physical memory") and other hardware components. There can be more than one CPU 170. A CPU 170 can be a multi-core processor and each core of a CPU 170 can be used to assign a virtual CPU 135 to a virtual machine 130.

The computer system 100 includes one or more devices 150 (also referred to as "physical devices," for example, audio/video devices, network interface devices, printers, graphics modules, etc.) that are capable of performing direct memory access (DMA) transactions. For simplicity of the illustration, only one device 150 is shown. It is understood that the computer system 100 may include any number of devices.

System 100 includes physical host memory 190 (main memory), such as volatile memory (e.g., random access memory (RAM)). The host memory 190 is memory that is actually present in the computing system 100 and has physical addresses (host physical addresses). Each virtual machine 130 can be assigned guest memory 180 that contains a guest address space that is mapped to host memory 190. The host memory 190 can be addressed by the physical devices (e.g., the device 150). The host memory 190 is distinguishable from guest memory 180, which is addressed by the guest OS 140. Guest memory 180 is a guest address space having guest addresses (hereinafter also referred to as "guest physical addresses"). The guest physical addresses are in the guest address space of the guest memory 180 that is assigned to the guest OS 140 and are considered by the guest OS 140 to be its physical address space. The host physical addresses are in the physical address space of the host memory 190 and can be used to access the host memory 190.

The physical address space for the host memory 190 is divided into equal-sized pieces called page frames 192. The page frames 192 of the host memory 190 are accessible by corresponding host physical addresses. For simplicity of the illustration, only one page frame 192 is shown. It is understood that the host memory 190 may include any number of page frames.

A guest address space is divided into equal-size pieces called pages 182 and are accessible by corresponding guest physical addresses. For simplicity of the illustration, only one page 182 is shown. It is understood that the guest memory 180 may include any number of pages. A "page," "memory page," or "virtual page" is a fixed-length contiguous block of guest memory 180 described by a single entry in a CPU page table 121 in the hypervisor 125. A CPU page table 121 is a data structure to store the mappings between guest physical addresses 112 and host physical addresses 125. The CPU page table 121 can keep track of the pages that are resident in the host memory 190. The CPU page table 121 can include page table entries for the range of guest physical addresses that is allocated to a guest OS 140. Each mapping between a guest physical address 112 to a host physical address 125 can include a read/write (RW) bit 127 for each page to indicate the type of access that is permitted for the page that corresponds to the guest physical address 112. In one implementation, the RW bit 127 is represented by one or more bits.

The computer system 100 may also be coupled to one or more data stores 104. The data stores 180 can be secondary storage to the host memory 190. The data store 104 can be a persistent storage that is capable of storing data. A persistent storage can be a local storage unit or a remote storage unit. Persistent storage can be disk, a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The computer system 100 can support over-commitment of memory, where the guest address space allocated to the virtual machines 130 exceeds the available physical address space in the computer system 100. With a guest address space, the system 100 can identify pages 182 that have identical data and consolidate pages to a single shared page by modifying mappings to point to point to the single shared page of the data to free up space in the host memory 190 to load data for other pages 182 into the host memory 190 and can emulate an unlimited host memory 190 space even though system 100 may have limited physical host memory 190 installed.

A device 150 can be assigned to a guest OS 140, and the guest OS 140 can include a device driver 142 for the device 150. A device 150 can support direct memory access (DMA) to transfer its I/O data directly to and from the host memory 190 without the need to involve the CPU 170. The device 150 performs DMA using a DMA buffer. The DMA buffer is in the address space allocated to one of the virtual machines 130. The DMA buffer can be used by the device 150 to directly transfer input data to the virtual machine 130 and/or directly transfer output data from the virtual machine 130. In traditional DMA systems, only a portion of the host physical memory that is exposed to a guest OS 140 is accessible to a device 150 for DMA, and the bus addresses for the guest memory 180 for DMA are generally stored in registers 156.

When a device 150 attempts to access the host memory 190, the host IOMMU 160 can translate the bus address into a host physical address. In conventional DMA systems, since only a portion of host physical memory is used for DMA, the host IOMMU 160 may be updated when the portion of host physical memory for DMA changes. Guest physical addresses for the virtual machine 130 can be passed to the device driver 142 and programmed by the device driver 142 into the device registers 156 as the addresses of the DMA buffer. For simplicity of discussion, only one guest physical address being used as a bus address is described. It is understood that a DMA transaction may involve multiple guest physical addresses to be used as bus addresses.

Implementations of the present disclosure include a host IOMMU 160 to implement an IOMMU page table 165 and a one-time translation of the guest physical addresses 112 of the pages of the guest address space to the host physical addresses 125 of the physical page frames of the host memory 190. The host IOMMU 160 can be a separate component from the device 150 or may be located within the device 150. The IOMMU page table 165 is a one-time mapping of all of the guest physical addresses 112 to the host physical addresses 125. With all of the guest physical addresses 112 mapped to the host physical addresses 125, and with all guest memory pinned in host physical memory, there is no change in the mapping, which results in no need to further update the mappings in IOMMU page table 165 or in the CPU page table 121, which reduces the overhead conventionally incurred for exiting the to the hypervisor 125 to perform the updates.

Each mapping in the IOMMU page table 165 between a guest physical address 112 to a host physical address 125 can include a read/write (RW) state 162 for each page to indicate the type of access (e.g., read only, read/write, write only) is permitted for the page that corresponds to the guest physical address 112. In one implementation, the RW state 162 is represented by one or more bits.

Unlike traditional DMA systems that do not support page faults for DMA by a device 150 that is assigned to a guest OS 140, implementations of the present disclosure include a guest OS 140 to support DMA by the device 150, even for a requested page 182 that is write-protected. The device driver 142 can receive a DMA write request, for example from an application or process running the virtual machine 130, to write to a page 182 at a particular page guest physical address. Before the DMA write request is sent to the device 150, the guest OS 140 causes the virtual CPU 135 to write to the page at the requested page guest physical address, and then sends the DMA write request to the device 150. If the requested page is not write protected, there is no exit to the hypervisor 125 and the device 150 can use the mapping in the IOMMU page table 165 to write to the requested page in the host memory 190. If the requested page is write protected, a page fault can be triggered by the virtual CPU's attempt to write to the requested page, and the hypervisor 125 can take control to create a copy of the requested page for the DMA write operation.

Figure 2:
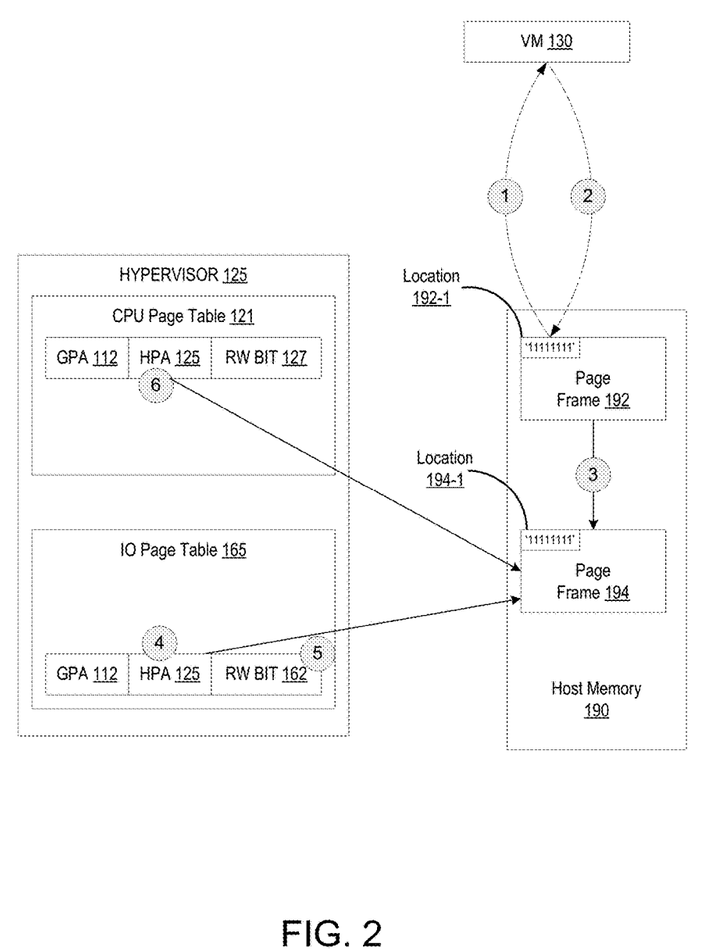
FIG. 2 depicts a block diagram illustrating an example of shared memory page host copy on write, in accordance with one or more aspects of the present disclosure.

FIG. 2 is a block diagram illustrating an example of executing an atomic instruction to create a writable page for a DMA write operation by a device assigned to a guest operating system, in accordance with one or more implementations of the present disclosure. The guest OS of virtual machine (VM) 130 detects a DMA write request to write to guest memory at a particular guest physical address (GPA) 112. The GPA 112 is mapped to page frame 192 in host memory 190. The guest OS reads (reference 1) a byte of data from location 192-1 of page frame 192 (e.g., a single byte of data starting from the beginning of the page). The guest OS then determines that the value of the byte read from location 192-1 as '11111111' (a byte of data set to all ones). The guest OS subsequently executes an atomic instruction that writes the value of the data read from location 192-1 back to the same location of page frame 192 (e.g., back to location 192-1).

The atomic instruction may then execute a comparison of the data read to the data at location 192-1, and a subsequent write atomically to prevent another process from updating the data at location 192-1 prior to being rewritten by the guest OS of VM 130. Thus, the atomic instruction results in a write to page frame 192 without modifying the data from page frame 192 (e.g., the same data is written back to the same location from which it was read). Upon successful execution of the atomic instruction, the guest OS then sends the DMA write request to the device.

The page frame 192 is write-protected and the atomic instruction's write to the page frame 192 at location 192-1 triggers a protection page fault in view of a write protection attribute associated with the page. The hypervisor 125 detects the page fault and copies (reference 3) the data at page frame 192 to page frame 192 in host memory 190 to create a writable page for the device. Thus, the first byte of data from page frame 194 (e.g., at location 194-1) is the same as that of page frame 192 (e.g., at location 192-1). The hypervisor 125 updates (reference 4) the mapping in the IOMMU page table 165 to have GPA 112 point to the host physical address (HPA) 125 for page frame 194. The hypervisor 125 sets (references 5) the read/write (RW) bit 162 for write access to make page frame 194 writeable. The hypervisor 125 updates the mapping in the CPU page table 121 to also have GPA 112 point to HPA 125 for page frame 194 (reference 6).

Figure 3:
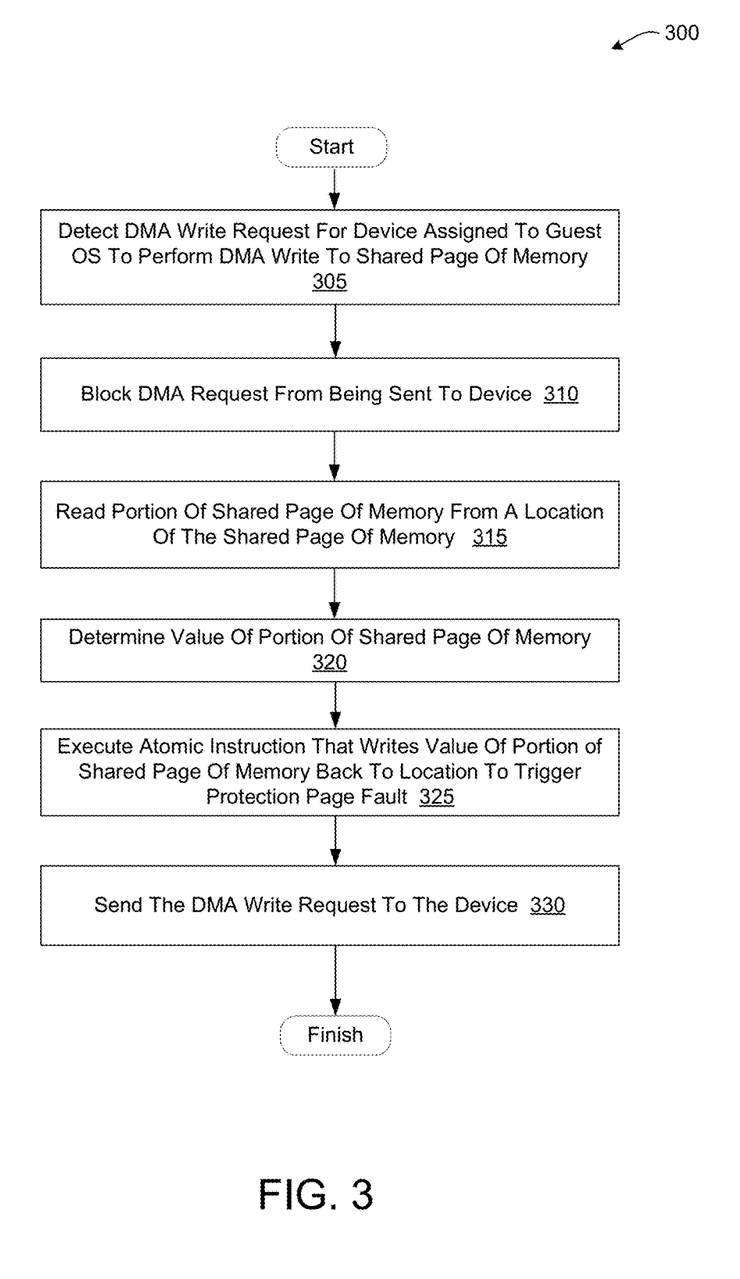
FIG. 3 depicts a flow diagram of a method for guest initiated atomic instructions for shared memory page host copy on write, in accordance with one or more aspects of the present disclosure.
Figure 4:
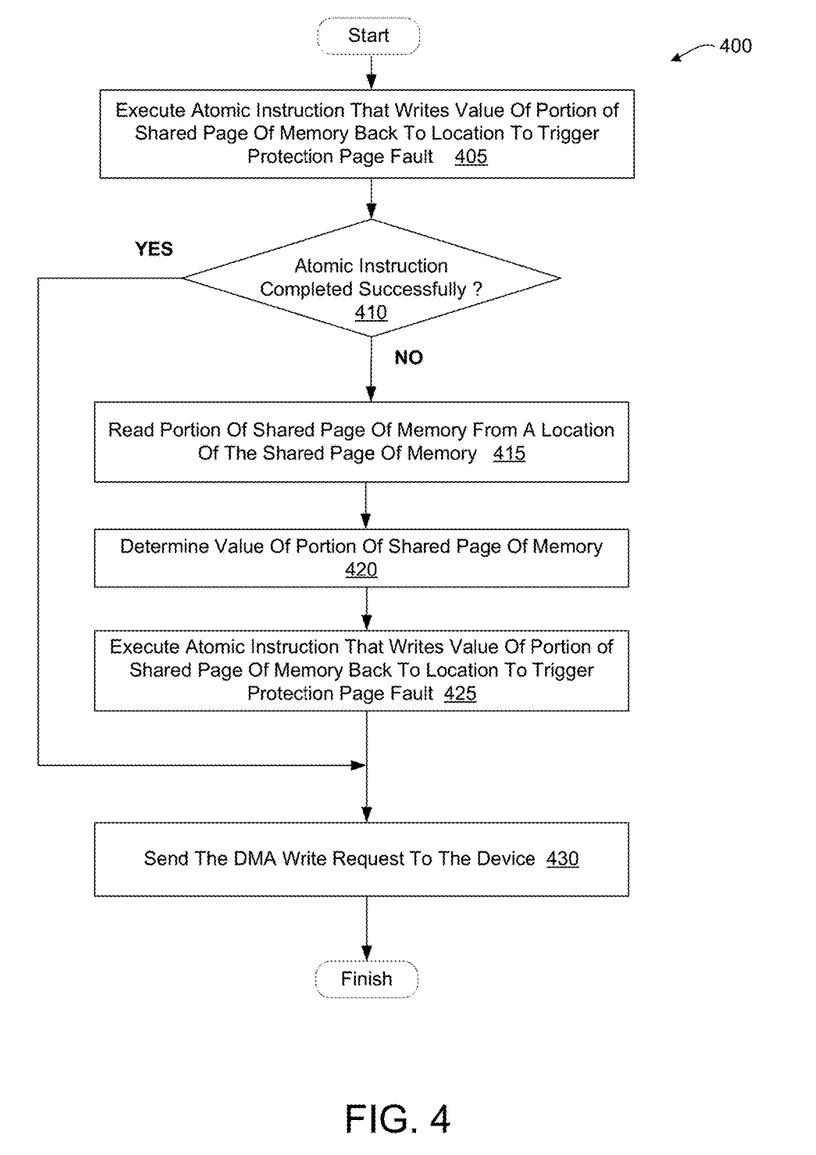
FIG. 4 depicts a flow diagram of an alternative method for guest initiated atomic instructions for shared memory page host copy on write, in accordance with one or more aspects of the present disclosure.

FIG. 3 depicts a flow diagram of an example method 300 for guest initiated atomic instructions for shared memory page host copy on write. The method may be performed by processing logic that may comprise hardware (circuitry, dedicated logic, etc.), software (such as is run on a general purpose computer system or a dedicated machine), or a combination of both. In one illustrative example, method 300 may be performed by shared memory page manager 143 of guest OS 140 in FIG. 1. Alternatively, some or all of method 300 might be performed by another module or machine. It should be noted that blocks depicted in FIG. 3 could be performed simultaneously or in a different order than that depicted.

At block 305, processing logic detects a DMA write request for a device assigned to a guest OS to perform a DMA write to a shared page of memory. The shared page of memory may have a write protection attribute to cause a protection page fault upon an attempt to write to the shared page of memory. In some implementations, processing logic can monitor a device driver and detect that the device driver receives instructions from a process running in a virtual machine to perform a DMA write operation by the device that is assigned to the guest OS of the virtual machine. The DMA write request may include a guest physical address for the requested shared page of memory. In some implementations, the device driver can send a request to the guest OS to allow a DMA write operation to an address. In response to such a request, the guest OS can immediately execute an atomic instruction (as described in further detail below) before returning control to the device driver.

At block 310, processing logic blocks the DMA request from being sent to the device. In some implementations, processing logic can trap the device driver for the device and obtain control to block the device driver from sending the DMA write request to the device. Processing logic may then read a portion of the shared page of memory from a particular location of the shared page of memory.

At block 315, processing logic reads a portion of the shared page of memory from a particular location of the shared page of memory. Processing logic may read any amount of the shared page of memory (e.g., bits, bytes, etc.) from any location of the shared page of memory (e.g., the beginning of the page, the end of the page, a specific address location within the page, a specific offset from the beginning of the page, etc.). For example, processing logic may read a byte of memory starting at the first memory location of the shared memory page (e.g., the first byte of the shared memory page).

At block 320, processing logic determines the value of the portion of the shared page of memory read at block 315. For example, processing logic may determine that the first byte (8 bits) read from the first position of the shared memory page (e.g., read from the beginning of the page) has a value of '11111111'.

At block 325, processing logic executes an atomic instruction that writes the value of the portion of the shared memory page from block 320 back to the location of the shared memory page read at block 315 to trigger a page protection fault. The atomic instruction can lock the location of the shared page of memory specified in the instruction, preventing it from being updated by another process until the atomic instruction completes. The page protection fault may then cause an exit to the hypervisor to create a writeable copy of the shared page of memory that can be used by the device for the DMA write request.

In some implementations, the atomic instruction may be an atomic compare and swap. In some implementations, the atomic instruction may perform a logical "OR" operation on the value of the portion of the shared page of memory with a value of all zeros. In some implementations, the atomic instruction may perform a logical "AND" operation on the value of the portion of the shared page of memory with a value of all ones. In some implementations, the atomic instruction may perform an arithmetic operation on the value of the portion of the shared page of memory with a value of all zeros, where the arithmetic operation is either an ADD operation or a SUBTRACT operation. In some implementations, the atomic instruction may perform an arithmetic operation on the value of the portion of the shared page of memory with a value of all ones, where the arithmetic operation is a MULTIPLY operation. Although several examples of atomic instructions have been described for simplicity, it should be noted that other atomic instructions may be used that cause a write to a memory page without modifying the contents of the memory page.

At block 330, processing logic sends the DMA write request to the device so the device may execute the DMA write to the writable copy of the shared page of memory. After block 330, the method of FIG. 3 terminates FIG. 4 depicts a flow diagram of an example method 400 for guest initiated atomic instructions for shared memory page host copy on write. The method may be performed by processing logic that may comprise hardware (circuitry, dedicated logic, etc.), software (such as is run on a general purpose computer system or a dedicated machine), or a combination of both. In one illustrative example, method 400 may be performed by shared memory page manager 143 of guest OS 140 in FIG. 1. Alternatively, some or all of method 400 might be performed by another module or machine. It should be noted that blocks depicted in FIG. 4 could be performed simultaneously or in a different order than that depicted.

At block 405, processing logic executes an atomic instruction that writes the value read from a portion of a shared memory page back to the same location from which it was read to trigger a protection page fault. The atomic instruction can lock the location of the shared page of memory specified in the instruction, preventing it from being updated by another process until the atomic instruction completes. The page protection fault may then cause an exit to the hypervisor to create a writeable copy of the shared page of memory that can be used by the device for the DMA write request. The atomic instruction may be one of the examples noted above at block 325 of FIG. 3. Alternatively, the atomic instruction may any other atomic instruction that can cause a write to a memory page without modifying the contents of the memory page.

In some implementations, the atomic instruction may be associated with a "succeed-or-fail" property. For example, the instruction may either successfully update the shared page of memory (e.g., the instruction succeeds), or have no apparent effect on the shared page of memory (e.g., the instruction fails). In such implementations, the guest OS may send the DMA write request to the device responsive to determining that the atomic instruction completed successfully.

At block 410, processing logic determines whether the atomic instruction completed successfully. If so, processing proceeds to block 430 to send the DMA write request to the device. Otherwise, processing continues to block 415 to repeat the execution of the atomic instruction.

At block 415, processing logic re-reads a portion of the shared page of memory from a location of the shared page of memory. Processing logic may read any amount of the shared page of memory (e.g., bits, bytes, etc.) from any location of the shared page of memory (e.g., the beginning of the page, the end of the page, a specific address location within the page, a specific offset from the beginning of the page, etc.). For example, processing logic may read a byte of memory starting at the first memory location of the shared memory page (e.g., the first byte of the shared memory page).

At block 420, processing logic determines the value of the portion of the shared page of memory read at block 415. For example, processing logic may determine that the first byte (8 bits) read from the first position of the shared memory page (e.g., read from the beginning of the page) has a value of '11111111'.

Figure 5:
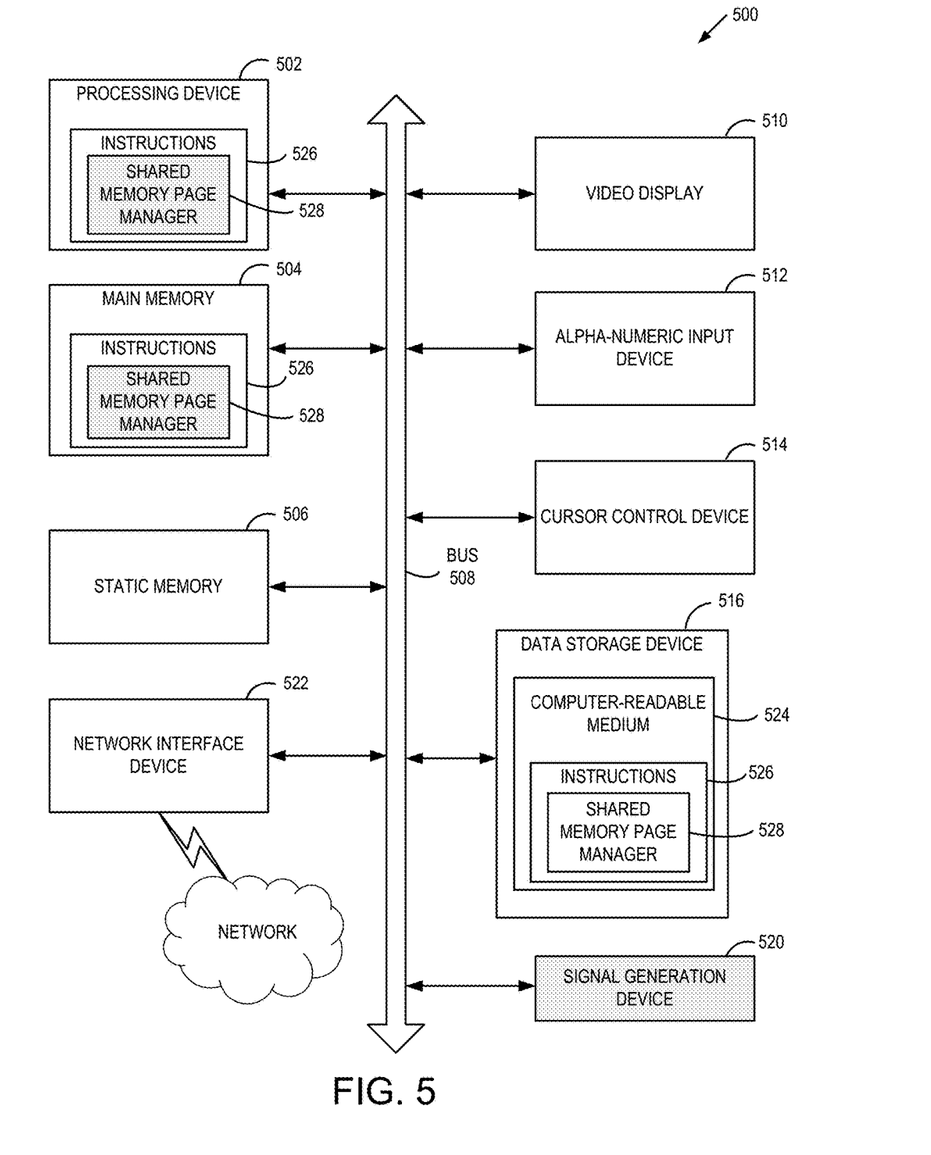
FIG. 5 depicts a block diagram of an illustrative computer system operating in accordance with examples of the invention.

At block 425, processing logic executes the atomic instruction that writes the value of the portion of the shared memory page from block 420 back to the location of the shared memory page read at block 415 to trigger a page protection fault. At block 430, processing logic sends the DMA write request to the device. After block 430, the method of FIG. 4 terminates FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 902 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes shared memory page manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored instructions 526 that include shared memory page manager 528 (e.g., corresponding to the methods of FIGS. 3-4, etc.) embodying any one or more of the methodologies or functions described herein. Shared memory page manager 528 may also reside, completely or at least partially, within the main memory 504 and/or within the processing device 502 during execution thereof by the computer system 500, the main memory 504 and the processing device 502 also constituting computer-readable media. Shared memory page manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting," "reading," "determining," "executing," "sending," "re-reading," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   detecting, by a processing device, a direct memory access (DMA) write request for a device assigned to a guest operating system to perform a DMA write to a shared page of memory, wherein the shared page of memory has a write protection attribute to cause a protection page fault upon an attempt to write to the shared page of memory;
   reading, by the processing device, a portion of the shared page of memory from a location of the shared page of memory;
   executing, by the processing device, an atomic instruction that writes a value of the portion of the shared page of memory back to the location of the shared page of memory to trigger the protection page fault in view of the write protection attribute; and
   upon executing the atomic instruction, sending, by the processing device, the DMA write request to the device to cause the device to write to a writable copy of the shared page of memory, the writable copy created responsive to the protection page fault.

2. The method of claim 1, further comprising:
   determining the value of the portion of the shared page of memory; and
   responsive to determining that the atomic instruction completed unsuccessfully:
      re-reading the portion of the shared page of memory from the location of the shared page of memory;
      determining a new value of the portion of the shared page of memory; and
      executing the atomic instruction that writes the new value of the portion of the shared page of memory back to the location of the shared page of memory to trigger the protection page fault in view of the write protection attribute.

3. The method of claim 1, wherein executing the atomic instruction comprises:
   executing an atomic compare and swap instruction using the value of the portion of the shared memory page.

4. The method of claim 1, wherein executing the atomic instruction comprises:
   executing an atomic instruction that performs a logical OR operation on the value of the portion of the shared page of memory with a value of all zeros.

5. The method of claim 1, wherein executing the atomic instruction comprises:
   executing an atomic instruction that performs a logical AND operation on the value of the portion of the shared page of memory with a value of all ones.

6. The method of claim 1, wherein executing the atomic instruction comprises:
   executing an atomic instruction that performs an arithmetic operation on the value of the portion of the shared page of memory using the value of all zeros, wherein the arithmetic operation comprises at least one of an add operation or a subtract operation.

7. The method of claim 1, wherein executing the atomic instruction comprises:
   executing an atomic instruction that performs an arithmetic operation on the value of the portion of the shared page of memory using the value of ones, wherein the arithmetic operation comprises a multiply operation.

8. The method of claim 1, wherein reading the portion of the shared page of memory from the location of the shared page of memory is completed during the execution of the atomic instruction.

9. A computing apparatus comprising:
   a memory to store instructions; and
   a processing device, operatively coupled to the memory, to execute the instructions, wherein the processing device is to:
      detect, by the processing device, a direct memory access (DMA) write request for a device assigned to a guest operating system to perform a DMA write to a shared page of memory, wherein the shared page of memory has a write protection attribute to cause a protection page fault upon an attempt to write to the shared page of memory;
      read, by the processing device, a portion of the shared page of memory from a location of the shared page of memory;
      execute, by the processing device, an atomic instruction that writes a value of the portion of the shared page of memory back to the location of the shared page of memory to trigger the protection page fault in view of the write protection attribute; and
      upon executing the atomic instruction, send, by the processing device, the DMA write request to the device to cause the device to write to a writable copy of the shared page of memory, the writable copy created responsive to the protection page fault.

10. The apparatus of claim 9, wherein the processing device is further to:
    determine the value of the portion of the shared page of memory; and
    responsive to determining that the atomic instruction completed unsuccessfully:
       re-read the portion of the shared page of memory from the location of the shared page of memory;
       determine a new value of the portion of the shared page of memory; and
       execute the atomic instruction that writes the new value of the portion of the shared page of memory back to the location of the shared page of memory to trigger the protection page fault in view of the write protection attribute.

11. The apparatus of claim 9, wherein to execute the atomic instruction, the processing device is further to:
    execute an atomic compare and swap instruction using the value of the portion of the shared memory page.

12. The apparatus of claim 9, wherein to execute the atomic instruction, the processing device is further to:
    execute an atomic instruction that performs a logical OR operation on the value of the portion of the shared page of memory with a value of all zeros.

13. The apparatus of claim 9, wherein to execute the atomic instruction, the processing device is further to:
    execute an atomic instruction that performs a logical AND operation on the value of the portion of the shared page of memory with a value of all ones.

14. The apparatus of claim 9, wherein to execute the atomic instruction, the processing device is further to:
    execute an atomic instruction that performs an arithmetic operation on the value of the portion of the shared page of memory using the value of all zeros, wherein the arithmetic operation comprises at least one of an add operation or a subtract operation.

15. The apparatus of claim 9, wherein to execute the atomic instruction, the processing device is further to:
execute an atomic instruction that performs an arithmetic operation on the value of the portion of the shared page of memory using the value of ones, wherein the arithmetic operation comprises a multiply operation.

16. A non-transitory computer readable storage medium, having instructions stored therein, which when executed by a processing device of a computer system, cause the processing device to:
detect, by the processing device, a direct memory access (DMA) write request for a device assigned to a guest operating system to perform a DMA write to a shared page of memory, wherein the shared page of memory has a write protection attribute to cause a protection page fault upon an attempt to write to the shared page of memory; and
execute, by the processing device, an atomic instruction that reads a portion of the shared page of memory from a location of the shared page of memory and writes a value of the portion of the shared page of memory back to the location of the shared page of memory to trigger the protection page fault in view of the write protection attribute.

17. The non-transitory computer readable storage medium of claim 16, wherein the processing device is further to:
determine the value of the portion of the shared page of memory; and
responsive to determining that the atomic instruction completed successfully, send, by the processing device, the DMA write request to the device to cause the device to write to a writable copy of the shared page of memory, the writable copy created responsive to the protection page fault; and
responsive to determining that the atomic instruction completed unsuccessfully:
re-read the portion of the shared page of memory from the location of the shared page of memory;
determine a new value of the portion of the shared page of memory;
execute the atomic instruction that writes the new value of the portion of the shared page of memory back to the location of the shared page of memory to trigger the protection page fault in view of the write protection attribute; and
send, by the processing device, the DMA write request to the device to cause the device to write to a writable copy of the shared page of memory, the writable copy created responsive to the protection page fault.

18. The non-transitory computer readable storage medium of claim 16, wherein to execute the atomic instruction, wherein the processing device is further to:
execute an atomic compare and swap instruction using the value of the portion of the shared memory page.

19. The non-transitory computer readable storage medium of claim 16, wherein to execute the atomic instruction, wherein the processing device is further to:
execute an atomic instruction that performs at least one of a logical OR operation on the value of the portion of the shared page of memory with a value of all zeros, or an arithmetic operation on the value of the portion of the shared page of memory using the value of all zeros, wherein the arithmetic operation comprises at least one of an add operation or a subtract operation.

20. The non-transitory computer readable storage medium of claim 16, wherein to execute the atomic instruction, wherein the processing device is further to:
execute an atomic instruction that performs a logical AND operation on the value of the portion of the shared page of memory with a value of all ones.

\* \* \* \* \*